United States Patent
Nicholas (10) Patent No.: US 8,746,210 B2
(45) Date of Patent: Jun. 10, 2014

(54) THROTTLE RETURN SPRING WITH ECCENTRIC LOCATOR COILS

(75) Inventor: Frank A. Nicholas, W. Henrietta, NY (US)

(73) Assignee: Delphi Technologies, Inc., Troy, MI (US)

(*) Notice: Subject to any disclaimer, the term of this patent is extended or adjusted under 35 U.S.C. 154(b) by 233 days.

(21) Appl. No.: 13/456,625

(22) Filed: Apr. 26, 2012

(65) Prior Publication Data

US 2013/0284147 A1  Oct. 31, 2013

(51) Int. Cl.
*F02D 9/02* (2006.01)
*F02D 9/08* (2006.01)
*F16K 31/04* (2006.01)

(52) U.S. Cl.
CPC .......... *F02D 9/02* (2013.01); *F02D 2009/0269* (2013.01); *F16K 31/043* (2013.01)
USPC .......................................... 123/396; 123/398

(58) Field of Classification Search
CPC .. F02D 9/02; F02D 2009/0269; F16K 31/043
USPC ........... 123/319, 396, 398–400, 339.15, 361, 123/403; 251/304, 305, 129.11
See application file for complete search history.

(56) References Cited

U.S. PATENT DOCUMENTS

| | | | |
|---|---|---|---|
| 5,429,090 A * | 7/1995 | Kotchi et al. ................. | 123/396 |
| 6,364,287 B1 | 4/2002 | Rauch et al. | |
| 6,575,427 B1 * | 6/2003 | Rauch et al. .................... | 251/69 |
| 2005/0155576 A1 * | 7/2005 | Tanimura et al. ............. | 123/399 |

* cited by examiner

*Primary Examiner* — Mahmoud Gimie
(74) *Attorney, Agent, or Firm* — Lawrence D. Hazelton (57) ABSTRACT

A helical torsion return spring and a throttle body assembly for urging a throttle plate of a throttle body assembly to a default position when a throttle motor of the throttle body assembly is disabled. The return spring includes a middle portion, a first end portion, a second end portion, a first spring leg, and a second spring leg. The throttle body assembly includes a throttle shaft, a first bushing, a second bushing, and the spring defined above. A first end portion center axis defined by the first end portion and a second end portion center axis defined by the second end portion are offset from a middle portion center axis defined by the middle portion.

7 Claims, 6 Drawing Sheets

THROTTLE RETURN SPRING WITH ECCENTRIC LOCATOR COILS

TECHNICAL FIELD OF INVENTION

This present invention relates to throttles for internal combustion engines, and more particularly, to an electronic throttle control return spring and assembly for positioning a throttle plate in a default position in response to an electronic throttle control system fault.

BACKGROUND OF INVENTION

An electronic throttle control system (ETC) for controlling the amount of air to an engine is well known. The throttle plate located in the throttle body assembly pivots in response to signals received from the engine control unit (ECU) to regulate the amount of air received by the intake manifold. The ECU disables the ETC when the ECU detects a potential ETC fault based on signals from throttle plate and/or accelerator pedal position sensors incorporated in the ETC. A throttle plate return spring is utilized to position the throttle plate in a default position when the ETC is disabled to allow just enough air to the engine so that the vehicle operator can limp home at a reduced vehicle speed.

Default throttle position variation can adversely affect the limp home driving performance. If the default throttle position is too far open, the vehicle may move faster than desired, and if the default throttle position is too far closed, the vehicle may not have enough power to climb hills. Prior art ETCs that have utilized a single return spring design have exhibited these undesirable limp home driving characteristics due to the excessive tolerance stack-up of the throttle assembly components and/or features that establish the throttle plate default position. Dual return spring designs have been suggested for reducing the amount of default position variation, but dual return spring designs are undesirable due to the associated increase in part costs and assembly complexity.

SUMMARY OF THE INVENTION

In accordance with one embodiment, a helical torsion return spring for urging a throttle plate of a throttle body assembly to a default position is provided. The spring includes a middle portion, a first end portion, a second end portion, a first spring leg, and a second spring leg. The middle portion is wound at a middle winding radius effective to define a middle portion center axis, a middle portion first end, and a middle portion second end. The first end portion is wound at a first end winding radius and extends from the middle portion first end effective to define a first end portion center axis and a first end portion termination. The first end winding radius is less than the middle winding radius, and the first end portion center axis is offset from the middle portion center axis. The second end portion is wound at a second end winding radius and extends from the middle portion second end effective to define a second end portion center axis and a second end portion termination. The second end winding radius is less than the middle winding radius, and the second end portion center axis is offset from the middle portion center axis. The first spring leg extends from the first end portion termination. The second spring leg extends from the second end portion termination.

In another embodiment, a throttle body assembly is provided. The throttle body assembly includes a throttle shaft, a first bushing, a second bushing, and a return spring as defined above. The throttle shaft passes through a throttle bore of the throttle body assembly. The first bushing surrounds the throttle shaft and defines a first bushing outer diameter. The second bushing surrounds the throttle shaft and defines a second bushing outer diameter. The return spring is held in position around the throttle shaft by the first bushing and second bushing. The first end portion defines a first end inner diameter that is slightly less than the first bushing outer diameter, and the second end portion defines a second inner diameter that is slightly less than the second bushing outer diameter.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
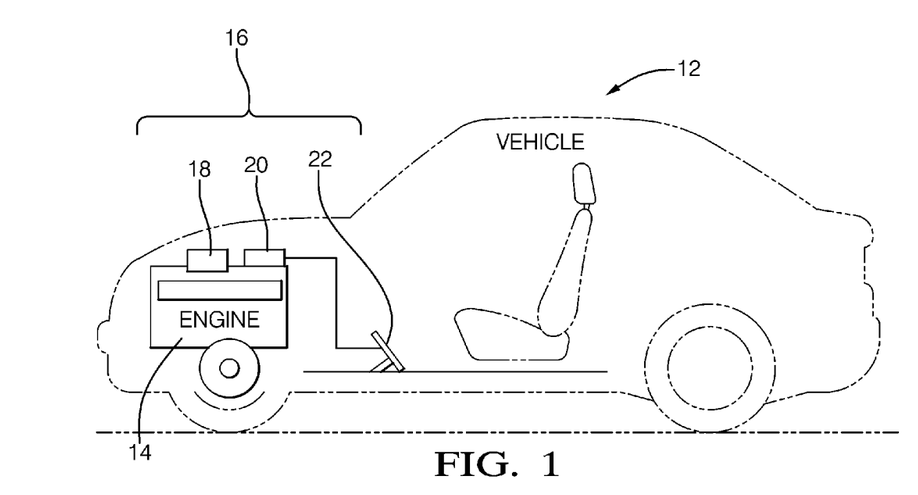
FIG. 1 is a view of a vehicle equipped with an electronic throttle control system (ETC) in accordance with one embodiment.

FIG. 1 illustrates a non-limiting example of a vehicle 12 that includes an engine 14 and an electronic throttle control system (ETC) 16. The ETC 16 includes a throttle body assembly 18, an engine control unit (ECU) 20, and an accelerator pedal position sensor 22. Based on signals from the accelerator pedal position sensor 22 that indicate the a desired engine torque by an operator (not shown), the ECU 20 commands the throttle body assembly 18 to allow the required amount of air to the engine 14 in order to generate the desired engine torque.

Figure 2:
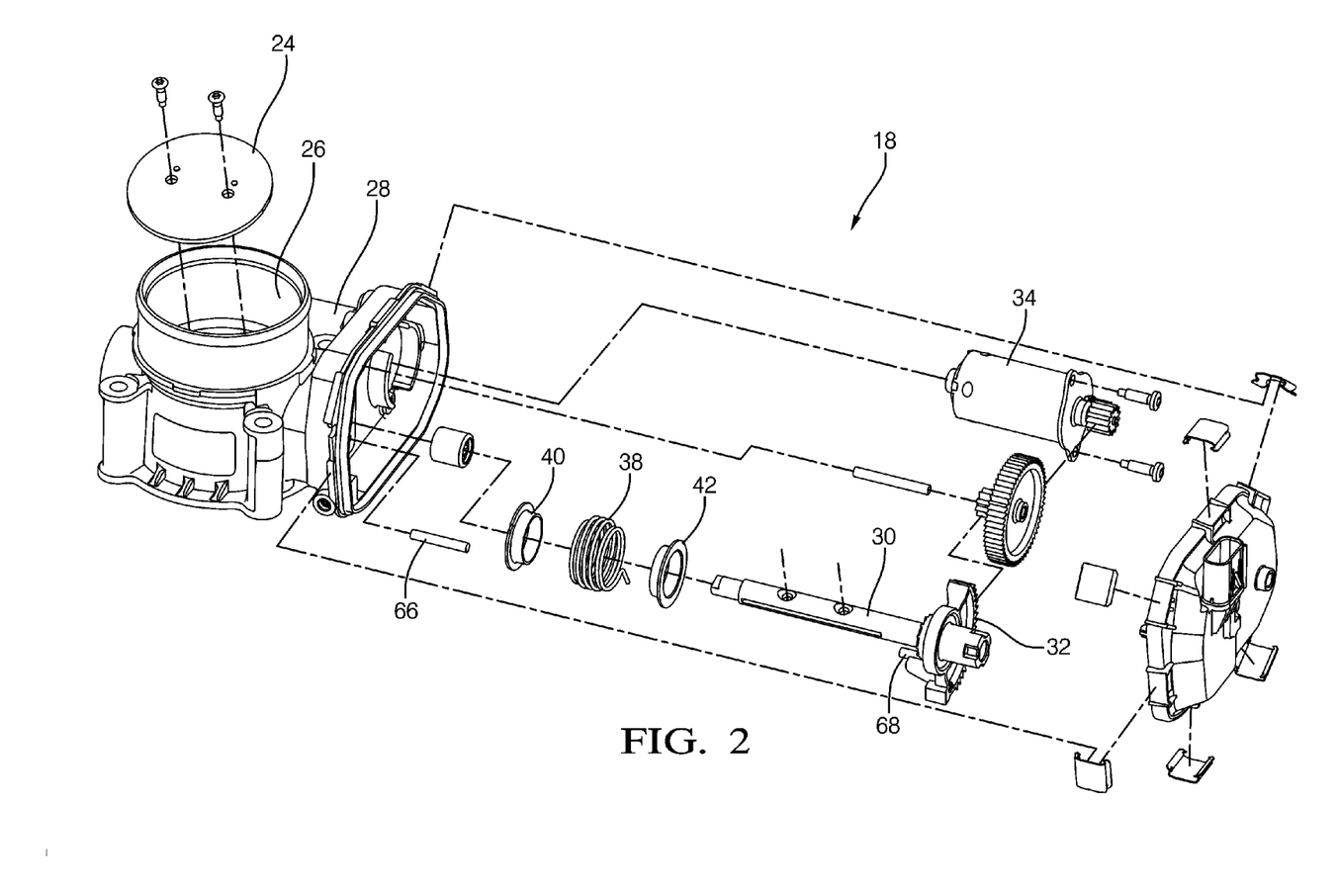
FIG. 2 is an exploded perspective view of the throttle body assembly of the ETC of FIG. 1 in accordance with one embodiment.
Figure 3:
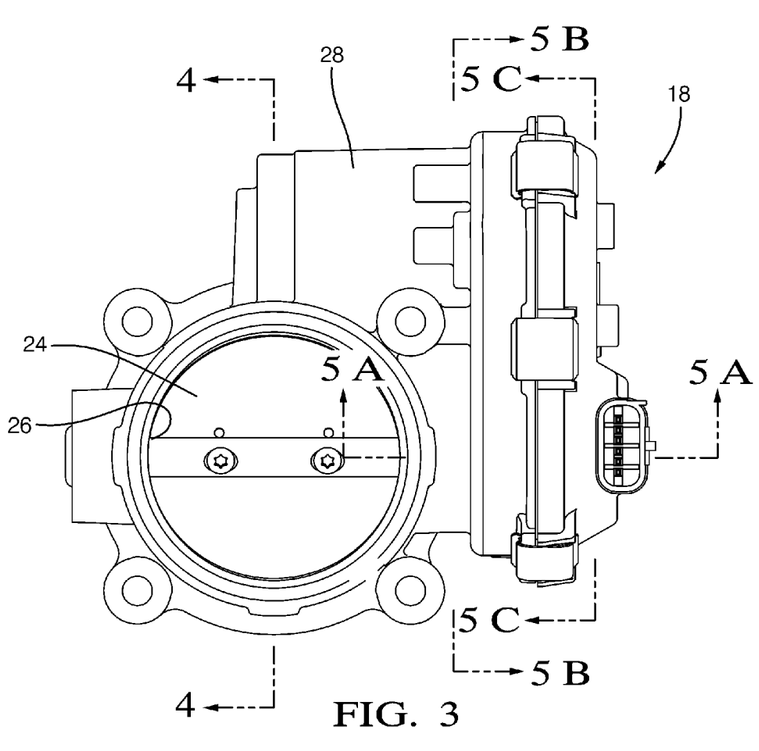
FIG. 3 is a top view of the throttle body assembly of FIG. 2 indicating sectional views for FIGS. 4, 5A, 5B, and 5C in accordance with one embodiment.

FIG. 2 illustrates a non-limiting example of the throttle body assembly 18 that includes a throttle plate 24 located within a valve bore 26 in a throttle body 28. The throttle plate 24 is typically rigidly attached to a throttle shaft 30 that passes through the valve bore 26 and rotates the throttle plate 24 within the valve bore 26 in order to regulate the amount of air received by the engine 14. A throttle gear 32 that is typically rigidly attached to the throttle shaft 30 is utilized to couple a motor 34 to the throttle shaft 30 that rotates the throttle plate 24. Based on signals from the accelerator pedal position sensor 22, the ECU 20 determines the desired engine torque of the engine 14, and provides the appropriate power to the motor 34 in order to rotate the throttle plate 24 to the desired position within the valve bore 26. A throttle plate position sensor (not shown) sends signals to the ECU 20 indicating the position of the throttle plate 24. A helical torsion return spring 38 surrounds the throttle shaft 30 and is held in position around the throttle shaft 30 with a first bushing 40 and a second bushing 42 surrounding the throttle shaft 30. The return spring 38 is configured to move the throttle plate 24 to a default position 44 (FIG. 4) when the motor 34 is disabled. The default position 44 for the throttle plate 24 will now be explained.

Figure 4:
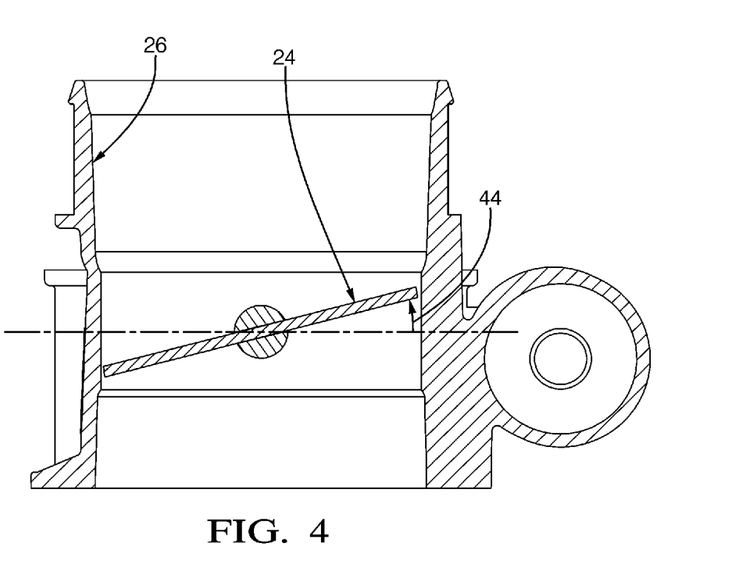
FIG. 4 is a sectional right side view of the throttle bore of the throttle body assembly of FIG. 2 with the throttle plate of the throttle body assembly of FIG. 2 in a default position in accordance with one embodiment.

The ECU relies on accurate signals from the accelerator pedal position sensor 22 and the throttle plate position sensor in order to control and monitor the ETC 16 such that the vehicle operates correctly and is safe to drive. If the ECU 20 detects a possible fault with a signal from the accelerator pedal position sensor 22 or the throttle plate position sensor, the ECU 20 may disable the motor 34 causing the return spring 38 to rotate the throttle plate 24 to the default position 44, as shown in FIG. 4. In the default position 44, the throttle plate 24 allows just enough air to the engine 14 to allow the vehicle 12 to be operated in a limp home mode that allows the vehicle to be driven without the benefit of throttle control. If throttle plate 24 is not held accurately in the default position, for example within +/−0.5 degrees, the engine 14 may output more or less than the desired limp home engine torque. As used herein, the term default position 44 means the position of the throttle plate 24 that allows just enough air to the engine 14 to allow the vehicle 12 to be operated in a limp home mode that allows the vehicle to be driven without the benefit of throttle control.

Figure 5:
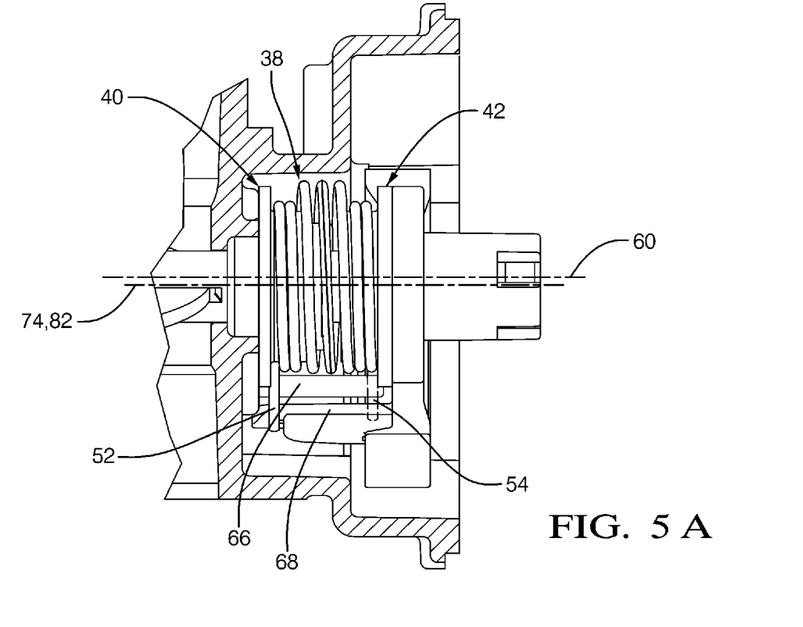
FIG. 5A is a sectional front view of the return spring of the throttle body assembly of FIG. 2 when installed onto the throttle body assembly of FIG. 2 with the throttle plate of the throttle body assembly of FIG. 2 in a default position in accordance with one embodiment.
FIG. 5B is a sectional left side view of the return spring of the throttle body assembly of FIG. 2 when installed onto the throttle body assembly of FIG. 2 with the throttle plate of the throttle body assembly of FIG. 2 in a default position in accordance with one embodiment.
FIG. 5C is a sectional right side view of the return spring of the throttle body assembly of FIG. 2 when installed onto the throttle body assembly of FIG. 2 with the throttle plate of the throttle body assembly of FIG. 2 in a default position in accordance with one embodiment.
Figure 5B:
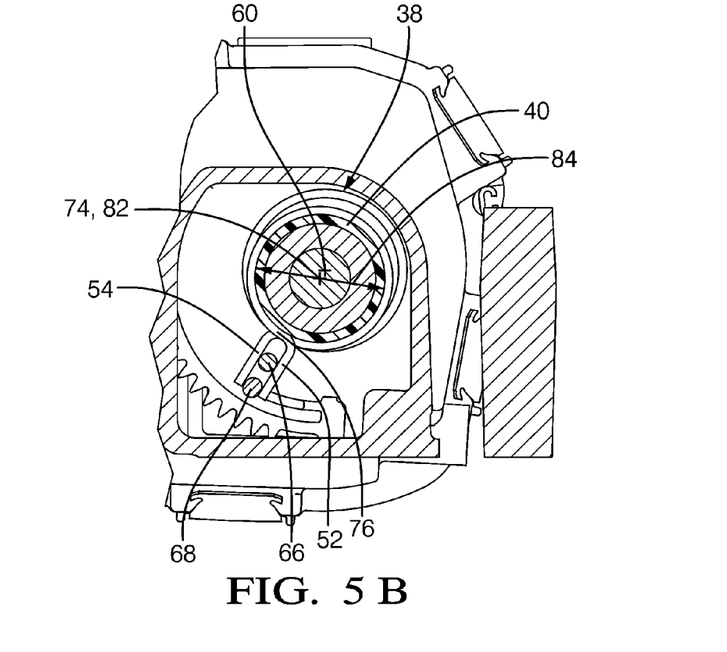
Figure 5C:
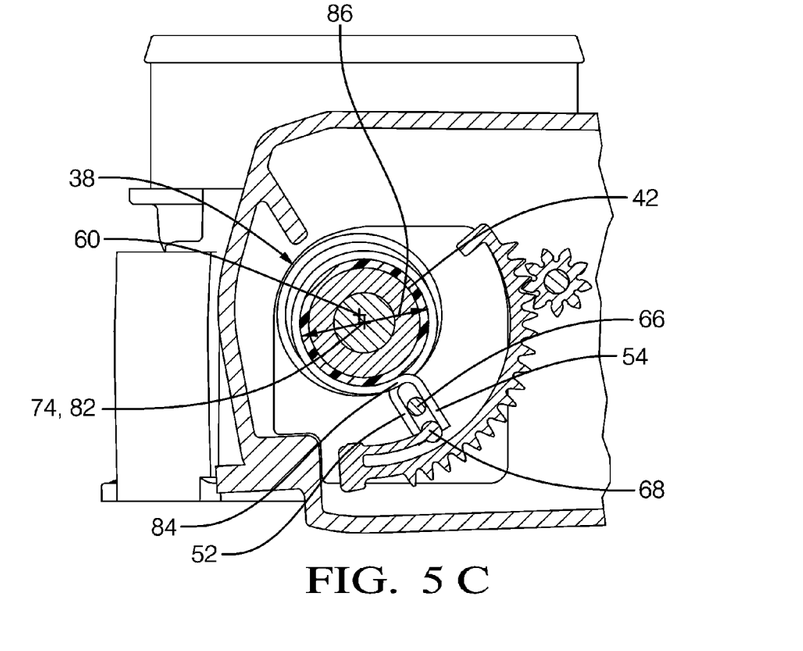

FIGS. 5A, 5B, and 5C illustrate a non-limiting example of the return spring 38 assembled onto the throttle body assembly 18. The return spring 38 includes a first spring leg 52 and a second spring leg 54 that load-up against a throttle body projection 66 extending from the throttle body 28 (FIG. 2) and a throttle gear projection 68 extending from the throttle gear 32 (FIG. 2) when the return spring 38 is preloaded and assembled onto the throttle body assembly 18 (FIG. 2). The throttle body projection 66, typically a metal pin, extends from the throttle body 28 to engage the first spring leg 52 and the second spring leg 54. The throttle gear projection 68, typically a plastic leg since the throttle gear 32 is typically plastic, extends from the throttle gear 32 to engage the first spring leg 52 and second spring leg 54. The throttle body projection 66 and the throttle gear projection 68 are configured such that when the throttle plate 24 is in the default position 44 (FIG. 4), the throttle body projection 66 and throttle gear projection 68 contact the first spring leg 52 and second spring leg 54. In general, the throttle body projection 66 and throttle gear projection 68 are sized sufficiently such that they do not deflect when loaded by the return spring 38.

Figure 6:
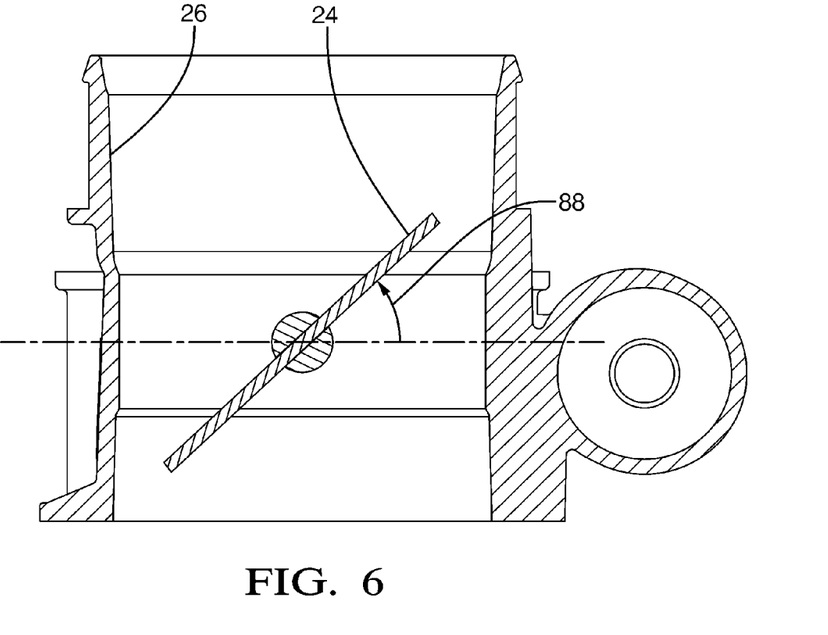
FIG. 6 is a sectional right side view of the throttle bore of the throttle body assembly of FIG. 2 with the throttle plate of the throttle body assembly of FIG. 2 in a wide open throttle position in accordance with one embodiment.
Figure 7:
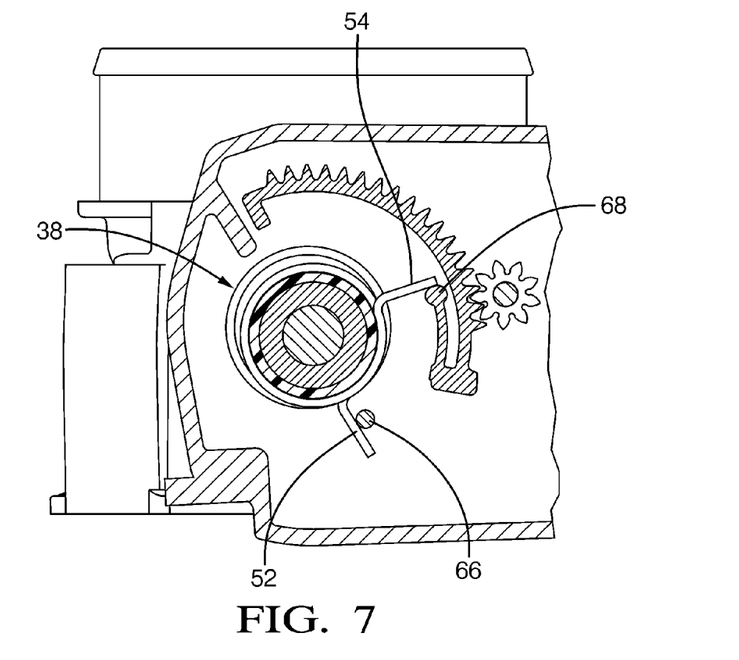
FIG. 7 is a sectional right side view of the return spring of the throttle body assembly of FIG. 2 when installed onto the throttle body assembly of FIG. 2 with the throttle plate of the throttle body assembly of FIG. 2 in a wide open throttle position in accordance with one embodiment.

When the return spring 38 is preloaded as part of being assembled onto the throttle body assembly 18, the return spring 38 exerts sufficient torque to rotate the throttle plate 24 to the default position 44, when the motor 34 is disabled. The return spring 38 exerts a default torque when the throttle plate 24 is in the default position 44 and exerts increasing torque as the motor 34 rotates the throttle plate 24 in either direction away from the default position 44. As used herein, the term default torque means the torque exerted by the return spring 38 when the return spring 38 is assembled onto the throttle body assembly 18 and the throttle plate 24 is in the default position 44. As illustrated in FIGS. 6 and 7, a peak torque is exerted by the return spring 38 when the throttle plate 24 is rotated from the default position 44 to a wide open throttle position 88 by the motor 34. As used herein the term peak torque means the torque exerted by the return spring 38 when the throttle plate is in a wide open throttle position 88. The default torque amount, which is used to configure the return spring 38, preferably is established based on analysis and/or empirical methods that indicate the amount of torque required to overcome rotational frictional forces that exist around the throttle shaft 30. The return spring 38 is configured to exhibit a substantially linear spring rate when assembled onto the throttle body assembly 18 in order to minimize the peak torque exerted by the return spring 38 and to provide a predictable torque vs. deflection output. Used herein the term substantially linear means the slope of the line varies less than 5%. Since the motor 34 must overcome increasing return spring torque as it moves the throttle plate 24 away from the default position 44, a minimal peak spring torque is desirable in order to reduce the size and power requirements for the motor 34. A predictable torque vs. deflection output is desirable in order to simplify the development of the control algorithm for the motor 34.

As it will become apparent in the description that follows, the return spring 38 is configured to provide a substantially linear spring rate while simultaneously clamping tight to the first bushing 40 and second bushing 42. The substantially linear spring rate provides the benefits described above, whereas the tight clamping eliminates a source of positional variation that affects positioning of the throttle plate 24 when the motor 34 is disabled.

Figure 8A:
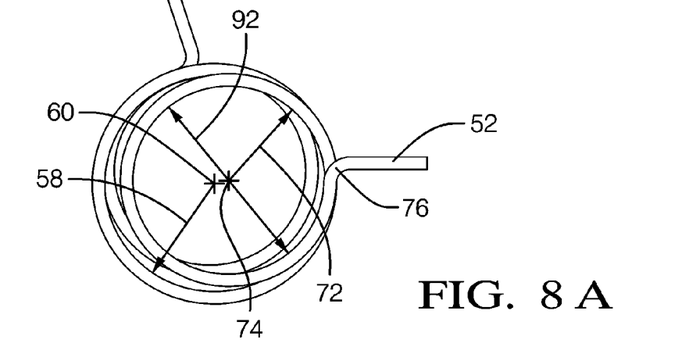
FIG. 8A is a left side view of the return spring of the throttle body assembly of FIG. 2 when not installed onto the throttle body assembly of FIG. 2 and in a relaxed state in accordance with one embodiment.
Figure 8B:
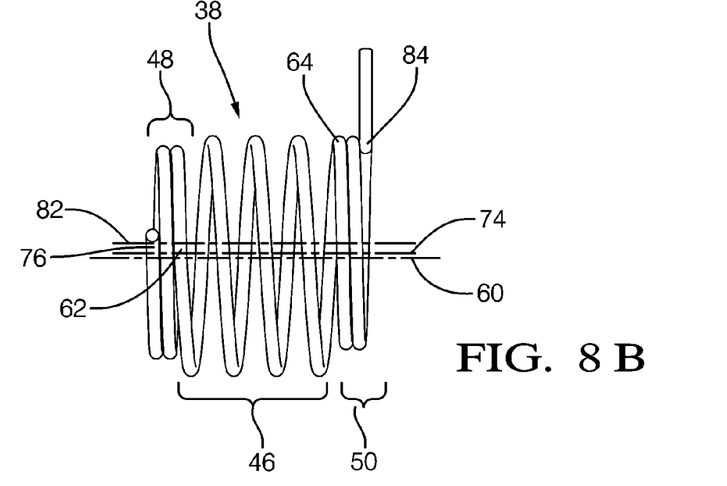
FIG. 8B is a front view of the return spring of the throttle body assembly of FIG. 2 when not installed onto the throttle body assembly of FIG. 2 and in a relaxed state in accordance with one embodiment.
Figure 8C:
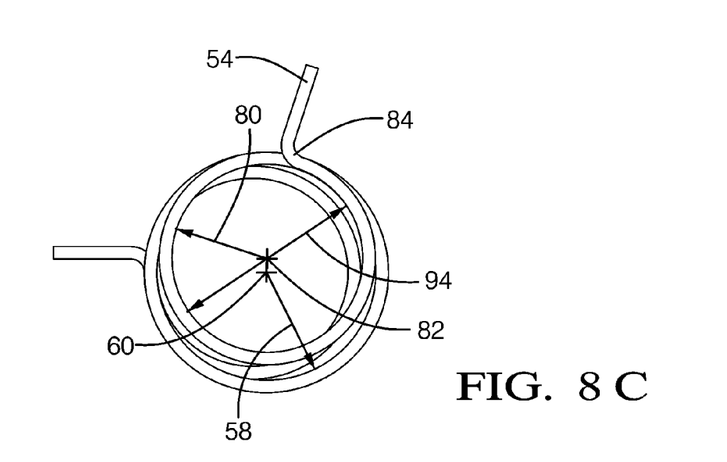
FIG. 8C is a right side view of the return spring of the throttle body assembly of FIG. 2 when not installed onto the throttle body assembly of FIG. 2 and in a relaxed state in accordance with one embodiment.

FIGS. 8A, 8B, and 8C further illustrate non-limiting features of the return spring 38 that are apparent when the return spring is in a relaxed state, i.e. not assembled onto the throttle body assembly. The return spring 38 is suitably made of metal wire of sufficient size and strength to generate peak torque when return spring 38 is configured as described herein. A middle portion 46 of the return spring 38 is wound at a middle winding radius 58 effective to define a middle portion center axis 60, a middle portion first end 62, and a middle portion second end 64. The middle portion 46 contains active coils for the return spring 38. As used herein the term active coils means coils that are utilized to generate spring torque. The middle winding radius 58 is preferably sized so that the middle portion 46 freely deflects inward when the return spring 38 is assembled onto the throttle body assembly 18 and loaded to peak torque. Free deflection of the middle portion 46 is preferred in order for the return spring 38 to exhibit a substantially linear spring rate. Extending from the middle portion first end 62 is a first end portion 48 effective to define a first end portion center axis 74, and extending from the middle portion second end 64 is a second end portion 50 effective to define a second end portion center axis 82. The middle portion first end 62 is located with respect to the middle portion second end 64 such that the first end portion center axis 74 and second end portion center axis 82 are positioned substantially collinear to each other and substantially parallel to the middle portion center axis 60 when the return spring 38 is assembled onto the throttle body assembly 18 with the throttle plate 24 in the default position 44, as shown in FIGS. 5A, 5B, and 5C. As used herein, the term substantially collinear means the axes are located within a distance of 5% of the middle winding radius from each other, and the term substantially parallel means the axes are parallel within 10 degrees. In conjunction, the middle portion 46 is wound with the appropriate winding radius size and number of active coils for the return spring 38 to generate default torque when the first end portion center axis 74 and second end portion axis 82 are positioned substantially collinear to each other and substantially parallel to the middle portion center axis 60. The method for calculating the winding radius size and number of active coils required to generate a specific spring torque is well known in the art and will not be described herein.

The first end portion 48 and second end portion 50 contain non-active coils. As used herein the term non-active coils means coils that are not utilized to generate spring torque. The first end portion 48 is wound at a first end winding radius 72 effective to define a first end portion termination 76, and the second end portion 50 is wound at a second end winding radius 80 effective to define a second end portion termination 84. Both the first end winding radius 72 and the second end winding radius 80 are less than the middle winding radius 58. The return spring 38 immediately transitions from the middle winding radius 58 to the first end winding radius 72 at the middle portion first end 62 such that first end portion center axis 74 is offset from and substantially parallel to the middle portion center axis 60. Likewise, the return spring 38 immediately transitions from the middle winding radius 58 to the second end winding radius 80 at the middle portion second end 64 such that the second end portion axis 82 is offset from and substantially parallel to the middle portion center axis 60. As used herein, the term immediately transitions means that the winding radius transition occurs within 5 degrees of spring winding. The immediate transitions eliminate the need for utilizing intermediate sized transitioning coils, which would be neither completely active nor non-active due to their intermediate winding radius size, allowing the return spring 38 to exhibit a substantially linear spring rate when loaded to peak torque in the throttle body assembly 18. Preferably, the first end winding radius 72 and the second end winding radius 80 are substantially the same, for example with +/−2% of a nominal value, so that a common bushing can be utilized for the first bushing 40 and the second bushing 42. The first end portion 48 defines a first end inner diameter 92 that is slightly less than a first bushing diameter 84 (FIG. 5B) defined by the first bushing 40, and has a sufficient number of coils to create a tight fit when the first bushing 40 is inserted into the first end portion 48. Likewise, the second end portion 50 defines a second end inner diameter 94 that is slightly less than a second bushing diameter 86 (FIG. 5C) defined by the second bushing 42, and has a sufficient number of coils to create a tight fit when the second bushing 42 is inserted into the second end portion 50. As used herein, the term slightly less means the winding radius is sized such that the end portion expands elastically without any permanent deformation when the bushing is inserted, and the term tight fit means the end portion stays in position on the bushing for the life of the ETC. The number of coils required to hold the end portions tight is preferably determined through analysis and/or empirical methods. The first end portion termination 76 is located such that the first end portion 48 ends approximately on a winding interval of 360 degrees from the middle portion first end 62. Likewise, the second end portion termination 84 is located such that the second end portion 50 ends approximately on a winding interval of 360 degrees from the middle portion second end 64. As used herein, the term approximately means within +/−5 degrees.

The first spring leg 52 extends from the first end portion termination 76 such that when the return spring 38 is assembled onto the throttle body assembly 18 with the throttle plate 24 in the default position 44, the first spring leg 52 contacts the throttle body protrusion 66 and the throttle gear protrusion 68 when the first end portion center axis 74 and second end portion center axis 82 are positioned substantially collinear to each other and substantially parallel to the middle portion center axis 60, as shown in FIGS. 5A, 5B, and 5C. Likewise, the second spring leg 54 extends from the second end portion termination 84 such that when the return spring 38 is assembled onto the throttle body assembly 18 with the throttle plate 24 in the default position 44, the second spring leg 54 contacts the throttle body protrusion 66 and the throttle gear protrusion 68 when the first end portion center axis 74 and second end portion center axis 82 are positioned substantially collinear to each other and substantially parallel to the middle portion center axis 60, as shown in FIGS. 5A, 5B, and 5C.

Accordingly, a throttle body assembly 18 and a return spring 38 are provided. The throttle body assembly 18 provides improved default throttle positioning accuracy over existing throttle body assembly single return spring designs by reducing the stack-up of component tolerances that affect the positioning of the throttle plate 24 when the motor 34 is disabled. The relatively tight fit between the return spring 38 and the first bushing 40 and second bushing 42, removes the tolerances of the first end winding radius 72 and second end winding radius 80 from the tolerance stack-up. The configuration of the return spring 38 allows for the throttle body assembly 18 to incorporate a single fixed feature (i.e. throttle body protrusion 66) and moveable feature (i.e. throttle gear projection 68) for engaging both the first spring leg 52 and the second spring leg 54, thus removing additional tolerances from the tolerance stack-up, that would have resulted from utilizing discrete fixed and moveable features for engaging the spring legs. Furthermore, the configuration of the return spring 38 allows the return spring 38 to exhibit a substantially linear spring rate when assembled onto the throttle body assembly 18, thus minimizing both the peak torque exerted by the return spring and the corresponding power requirements for the motor 34.

I claim:

1. A helical torsion return spring for urging a throttle plate of a throttle body assembly to a default position, said spring comprising:
   a middle portion wound at a middle winding radius effective to define a middle portion center axis, a middle portion first end, and a middle portion second end;

a first end portion wound at a first end winding radius and extending from the middle portion first end effective to define a first end portion center axis, and a first end portion termination, wherein the first end winding radius is less than the middle winding radius and the first end portion center axis is offset from the middle portion center axis;

a second end portion wound at a second end winding radius and extending from the middle portion second end effective to define a second end portion center axis, and a second end portion termination, wherein the second end winding radius is less than the middle winding radius and the second end portion center axis is offset from the middle portion center axis;

a first spring leg that extends from the first end portion termination; and a second spring leg that extends from the second end portion termination.

2. The return spring of claim 1, wherein the return spring immediately transitions from the middle winding radius to the first end winding radius at the middle portion first end.

3. The return spring of claim 2, wherein the return spring immediately transitions from the middle winding radius to the second end winding radius at the middle portion second end.

4. The return spring of claim 3, wherein the middle portion first end is located with respect to the middle portion second end such that the first end portion center axis and second end portion center axis are positioned substantially collinear to each other and substantially parallel to the middle portion center axis when the return spring is assembled onto the throttle body assembly with the throttle plate in the default position.

5. A throttle body assembly, comprising:

a throttle shaft passing through a throttle bore of the throttle body assembly;

a first bushing surrounding the throttle shaft, wherein the first bushing defines a first bushing outer diameter;

a second bushing surrounding the throttle shaft, wherein the second bushing defines a second bushing outer diameter; and a return spring in accordance with claim 1, said return spring held in position around the throttle shaft with the first bushing and the second bushing, wherein the first end portion defines a first end inner diameter that is slightly less than the first bushing outer diameter, and the second end portion defines a second end inner diameter that is slightly less than the second bushing outer diameter.

6. The throttle body assembly of claim 5, wherein the return spring immediately transitions from the middle winding radius to the first end winding radius at the middle portion first end, and the return spring immediately transitions from the middle winding radius to the second end winding radius at the middle portion second end.

7. The throttle body assembly of claim 6, further comprising a throttle plate attached to the throttle shaft and located in the throttle bore, wherein the middle portion first end is located with respect to the middle portion second end such that the first end portion center axis and second end portion center axis are positioned substantially collinear to each other and substantially parallel to the middle portion center axis when the return spring is assembled onto the throttle body assembly with the throttle plate in a default position.

* * * * *